Patented Dec. 22, 1942

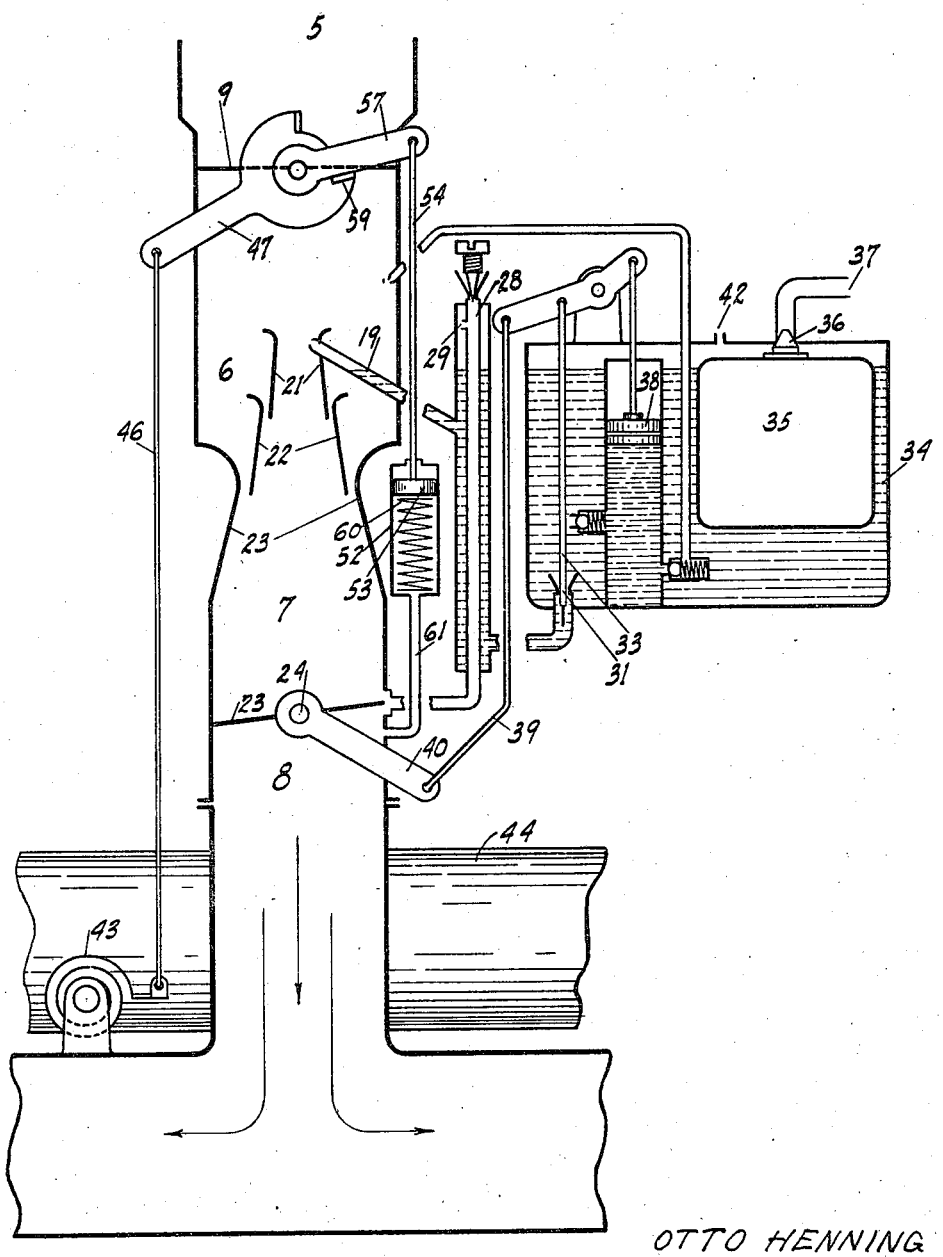

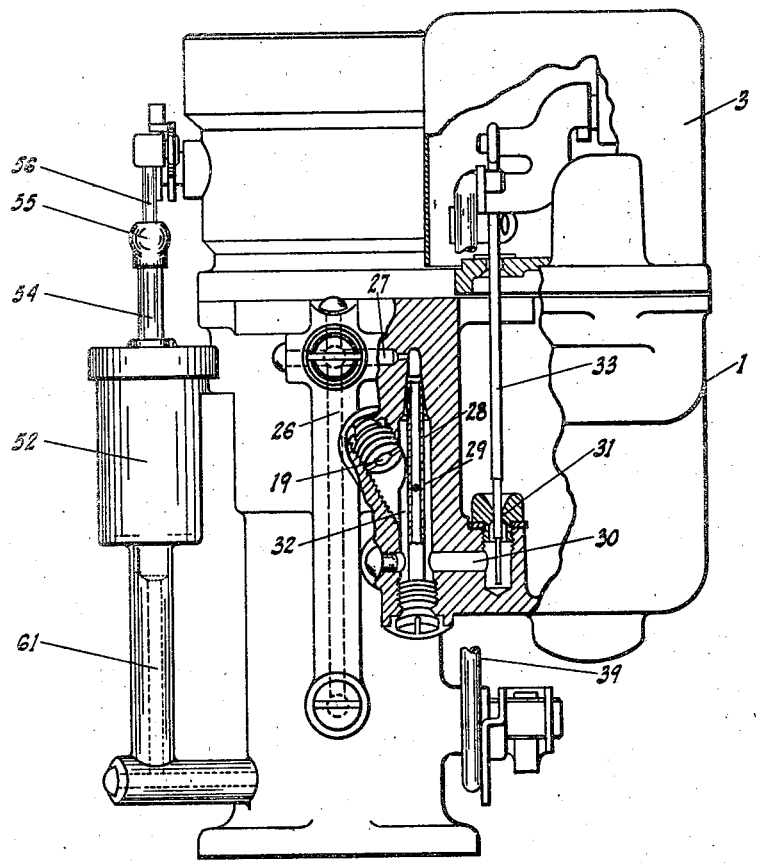
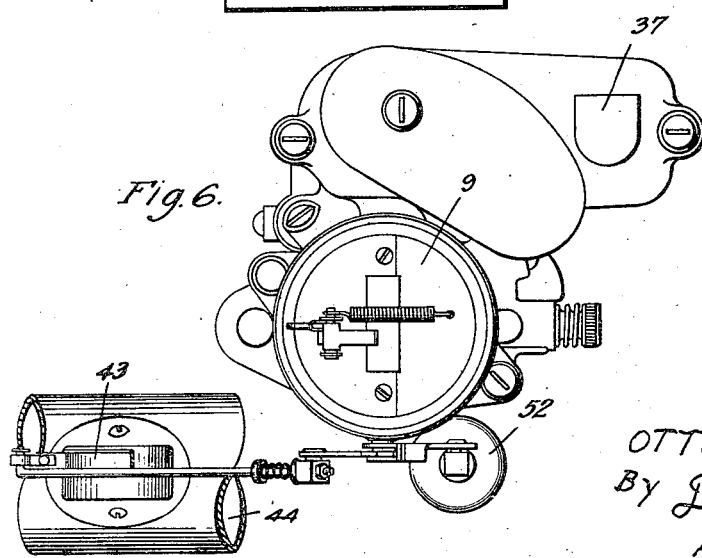

2,306,251

UNITED STATES PATENT OFFICE 2,306,251

INTERNAL COMBUSTION ENGINE

Otto Henning, St. Louis County, Mo., assignor, by mesne assignments, to Carter Carburetor Corporation, St. Louis, Mo., a corporation of Delaware Original application November 17, 1931, Serial No. 575,577. Divided and this application November 13, 1941, Serial No. 418,980

23 Claims. (Cl. 123—119)

This invention relates to carburetors for internal combustion engines, and more particularly to carburetors of the plain tube type. That is to say, the type in which the air and fuel inlets are of constant size regardless of suction during normal operation of the carburetor, at normal operating temperatures.

This application is a division of my co-pending application, Serial No. 575,577, filed November 17, 1931.

It is an object of this invention to provide a carburetor having new and improved means for automatically changing the operation thereof as the engine warms up or cools off, so that during the low temperature operation of the carburetor, such operation will embody at least some of the principles of the air valve carburetor, while at normal and high temperatures the carburetor will be operated strictly on the plain tube principle.

It is a further object of this invention to provide a carburetor in which fuel mixture ratio is automatically controlled both by temperature and suction, so that the mixture will be leaned out at high temperature and also at high suction.

It is a further object of this invention to provide a carburetor with means for automatically enriching the mixture when the engine stops and for automatically leaning out the mixture when the engine begins to operate under its own power.

It is a further object of this invention to provide a carburetor having a choke valve and to provide means for varying the position of said choke valve in accordance with the suction in the intake manifold of said engine.

It is a further object of this invention to provide a carburetor having a choke valve controlled by a thermostat and to provide means for limiting the tension to which said thermostat is subjected under high temperature conditions.

The invention will be better understood from the following description and the accompanying drawings, referring to which:

Figure 1A is a diagram of the carburetor according to my invention.

Figure 4 is a side elevation of the carburetor shown in Figure 1, with parts broken away and others shown in section.

Figure 6 is a plan view of the carburetor shown in Figures 1 to 5.

Figure 1:
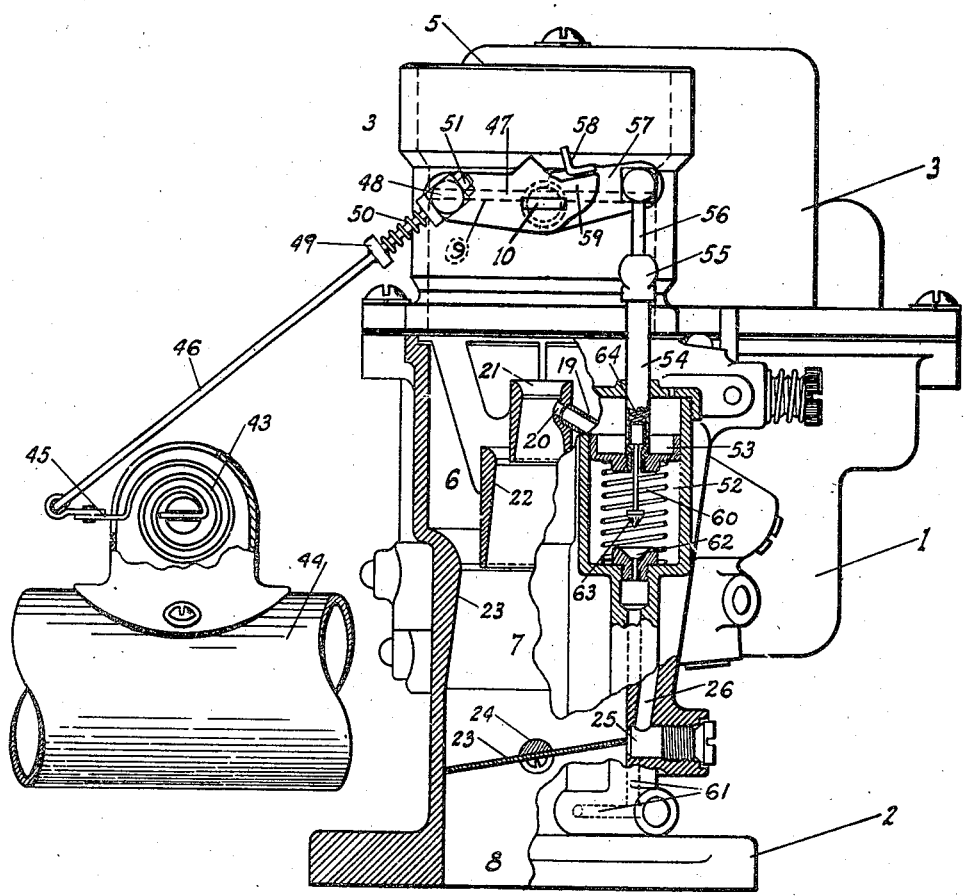
Figure 1 is a somewhat diagrammatic view showing an elevation of the carburetor with parts in section, and showing a section of the exhaust pipe with the controlling thermostat attached thereto.
Figure 2:
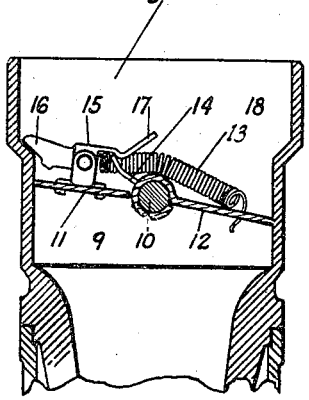
Figure 2 is a sectional view of the carburetor shown in Figure 1, showing choke valve when same is in closed position.

The reference numeral 1 indicates the lower half, or main body member of the carburetor. This lower half is provided with a flange 2 by means of which it may be attached to the intake manifold of an internal combustion engine. The upper half of the carburetor 3 is formed in a separate casting and superposed on the lower half. The two halves of the carburetor have a downdraft mixing conduit extending therethrough, which mixing conduit comprises air inlet 5, air chamber 6, mixing chamber 7, and discharge outlet 8.

The admission of air to the carburetor is controlled by a choke valve, which is generally indicated at 9, and which is carried by the shaft 10. The choke valve is made up of two sections, one section being rigidly attached to the choke valve shaft, as indicated at 11, and the other section 12 being pivotally attached to the choke valve shaft and operable by suction. A spring 13 yieldably attached to the two sections of the choke valve normally holds the section 12 in line with the section 11. Section 12 has a projection 14 thereon, for limiting its closing movement so that the action of the spring 13 will be stopped when section 12 has been brought into line with section 11. A latch 15 is pivotally mounted on the solid section 11 and has a latch contact member 16 thereon for contacting with the wall of the air inlet, and projection 17 at the other end thereof for contacting with the projection 14 to limit the opening movement of the valve portion 12. The construction and operation of this valve is shown and claimed in Patent No. 1,894,354 to Kommer and Henning, issued January 17, 1933.

The fuel is supplied to the mixing conduit through a nozzle 19 and nozzle tip 20, which nozzle tip is formed integral with the primary venturi 21. The primary venturi discharges into a secondary venturi 22, and the secondary venturi discharges into the main venturi 23, as indicated in Figure 1. The discharge of fuel mixture from the carburetor is controlled by throttle valve 23, which is pivotally carried on shaft 24, and the shaft is arranged for manual operation in any convenient manner.

Fuel for low speed operation is supplied to the mixing conduit through port or nozzle 25. This discharge outlet is shown in Figure 1 as a single port extending to both sides of the throttle when same is in closed position, but it will be understood that any other port construction or arrangement may be used if desired.

Fuel is supplied to the nozzle 25 by means of idle tube 26, connecting passageways 27—28, calibrated passageway 29, passage 30, and metering jet 31. Fuel for the main nozzle 19 is also supplied from jet 31, passage 30, and the chamber 32 which surrounds tube 28. Thus, it will be seen that the main nozzle 19 and idling nozzle 25 are connected by restricted passageway 29 and both nozzles receive their fuel in common from the jet 31, which is controlled in accordance with the position of the throttle by means of metering rod 33. The jet 31 takes its fuel from the chamber 34 in which the fuel is maintained at a constant level A—A by float 35 and needle valve 36. It may be noted at this point that either the float valve 36 or the lip 35a, which operates the float valve, may be chromium plated to prevent wear. Fuel is supplied in a conventional manner to needle valve 36 through connection 37 by the usual fuel pump or gravity tank.

The accelerating pump piston 38 is operated by means of a rocker arm 38a connected to the throttle through link 39 and operating arm 40. A suitable vent 41 is formed in the upper part of the float chamber above fuel level for connecting said float chamber to the inside of the mixing conduit.

Additional venting means for the float chamber, comprising an orifice 42 is also provided. Preferably, the orifice 42 is of smaller capacity than the orifice 41, whereby a draft will be created through the float chamber for cooling the fuel therein, but the fuel in the float chamber will also be subjected to a suction corresponding to the speed of air flowing through the carburetor.

The choke valve 9 is primarily controlled by thermostat 43, which is mounted on the exhaust pipe 44 of the engine. The thermostat is of the usual bimetallic type and is wound in such a manner that the free end 45 will turn in a clockwise direction, with reference to Figure 1, when the temperature is raised. The connection of the thermostat to the choke valve includes a link 46 which is pivoted to the free end of the thermostat and also to the arm 47 at pivot 48. The link 46 is provided with a shoulder 49, and a spring 50 is mounted around the link 46 above the shoulder, so that one end of the spring will contact with the shoulder and the other with the pivot member 48. It will be understood that the rod 46 is freely slidable in pivot 48 and its motion in one direction is limited by the spring, and motion in the other direction is limited by nut 51 which is fixed to the end of link 46.

Arm 47 in this modification is attached to the choke shaft 10. With the thermostat in the position shown in Figure 1, the choke valve will be in closed position; as the thermostat heats up, the choke valve moves to the postion indicated by dotted lines in Figure 1. The closed position of the choke valve will correspond to a thermostat temperature of approximately 50 to 70 degrees Fahrenheit, if the thermostat is mounted on the exhaust pipe as shown, and the full open position of the choke valve will be reached when the temperature of the thermostat is approximately 130 to 150 degrees Fahrenheit.

For providing an initial movement of the choke as soon as the engine starts to run under its own power, a cylinder 52 having a piston 53 slidably mounted therein is provided. The piston is connected by means of a hollow piston rod 54, ball and socket joint 55, and link 56 to an arm 57 which is mounted on the choke shaft. The arm is mounted to freely rotate on the choke shaft, but a stop 58 is provided to contact with an extension 59 on the arm 47, so that movement of the arm 57 in a clockwise direction with reference to Figure 1 will cause an opening movement of the choke valve.

A spring 60 is mounted in the cylinder 52 for normally holding the piston 53 in its raised position, so that the normal closing of the choke valve under the influence of the thermostat 42 will not be interfered with. A suction passage 61 is formed in the lower casting 1 to connect the discharge outlet of the carburetor with the lower end of the cylinder through a restricted orifice 62. The restriction of the orifice 62 is calibrated to provide a delayed action in the opening of the choke valve under the influence of the suction, otherwise, the mixture would be leaned out too quickly when the engine starts to run under its own power. A valve 63 slidably mounted in the hollow piston rod 54 and normally held in downward position by spring 64 is provided for closing off the orifice 62 after a predetermined movement of the piston.

Figure 7:
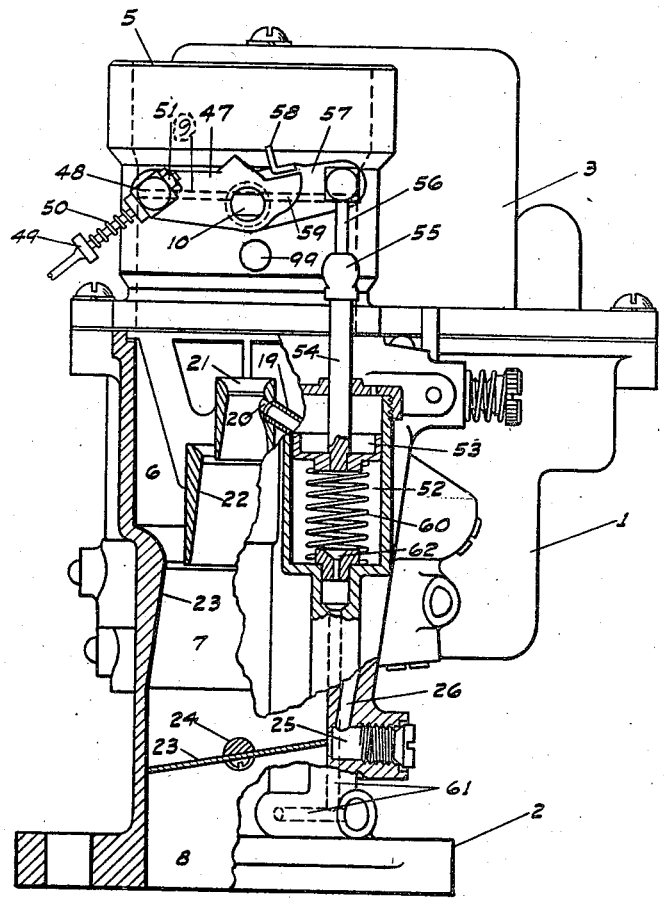
Figure 7 is a detail view showing a slightly modified form of the device.

A modified form of the invention may be constructed as shown in Figure 7. The arm 47 is loosely mounted on the shaft 10. The shaft 57 is tightly mounted on the shaft 10 and the valve 63 is omitted, the piston 53 being relied on to give a full opening movement of the choke valve under suction. It will be noted that the stop 58 is formed in two portions at an angle to each other, the lower portion of this member contacts with the projection 59 on one end of arm 47, and the upper portion contacts with the opposite end of the arm 47, permitting a lost motion of approximately 30 degrees between contact of the member 58 with the arm 47 and extension 59.

When this construction is used, there will be less danger of straining the thermostat 43 at high temperatures, because the lost motion between arm 47 and stop 58 will permit a substantially free movement of the thermostat after the normal operating temperature of approximately 150 degrees has been reached. It will be understood, of course, that extremely high temperatures on the exhaust pipe 44 are reached during operation of the car. These temperatures may reach 475 or 500 degrees Fahrenheit, and inasmuch as it is desired to have the choke valve fully opened by the thermostat at a temperature of approximately 150 degrees or less, the thermostat would be placed under a considerable strain after the full open position was reached, if some means were not provided for permitting free movement of the thermostat. The spring 50 is normally made weak enough to permit a substantially free movement of the thermostat, but when additional lost motion and free movement after the choke valve is opened is provided for, the danger of straining the member 43 at high temperatures is substantially eliminated.

The operation of the device is as follows:

Fuel is supplied from a conventional gravity tank or fuel pump to the connection 37, and the admission of fuel to the float bowl 34 is controlled by float valve 36 and float 35. The fuel is maintained at a substantially constant level A—A in the float chamber by the float mechanism and is supplied to the nozzles 19 and 25 by suction. It may be noted that all of the fuel from the float chamber for both of these nozzles passes through the jet 31.

When the engine is to be started cold, the choke valve 9 will be in closed position, and the thermostat 45 will be approximately in position shown in Figures 1 and 1a, thereby concentrating the suction developed by the engine on the fuel nozzles 20 and 25 (Figure 1), and drawing a very rich mixture into the engine for starting.

It will be understood that the normal cranking speeds of an engine are 100 R. P. M. or less, while the normal operating speeds are 200 R. P. M. or more. As soon as the engine begins to operate under its own power, the suction is very substantially increased. The suction at cranking speeds is approximately one-half pound per square inch, while at operating speeds, the suction with the choke valve in closed position will be six or seven pounds per square inch.

As soon as the engine starts to run under its own power, the increased suction will slightly open valve portion 12 against the resistance of the spring 13 until the movement of the member 12 is stopped by contact of the projection 14 with the latch 17 and admit some additional air to the engine to slightly lean out the mixture.

Figure 3:
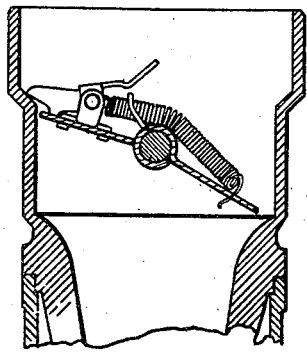
Figure 3 is a sectional view corresponding to Figure 2, except that the choke valve is in slightly open position.
Figure 5:
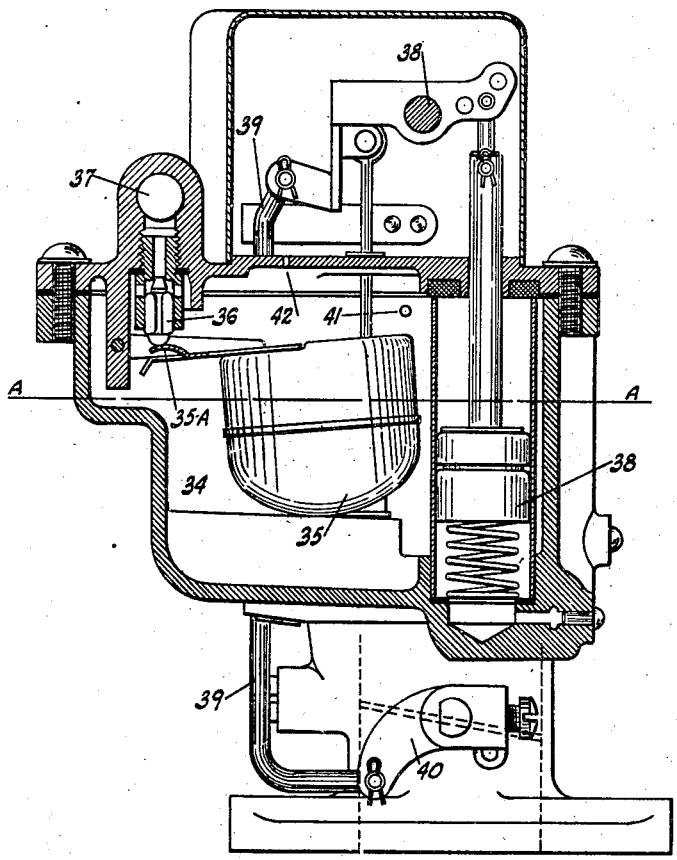
Figure 5 is a sectional view of the carburetor shown in Figure 1, the section being taken through the float bowl and accelerating pump.

At the same time that the engine starts to run under its own power, the suction will be supplied to cylinder 52 by means of connection 61, and will begin to draw the piston 53 downwardly, and open the choke valve. As soon as the solid portion of the choke valve reaches the position shown in Figure 3, the projection 17 on the latch 15 will pass out of contact with projection 14 on the yieldable portion of the valve permitting portion 12 of the choke valve to open further independently of portion 11 under the influence of the intake suction, and the carburetor may then operate as an air valve carburetor until the thermostat 43 has warmed up sufficiently to continue the opening movement of the choke valve. It will be noted that there is a pause in the opening movement of said valve after the operation of the suction cylinder is completed. During this pause, the thermostat 43 is being warmed up, and the piston chambers of the motor are also warming up. During this pause, the portion 12 of the choke valve, which is directly operated by suction, takes care of the requirements of the carburetor and opens or closes in accordance with the suction which may be applied. Preferably, the valve closing movement of the suction operated piston is just sufficient to insure the unlatching of the latch 15 so that the suction operated member 12 may rotate further independently of valve portion 11.

Within less than a minute after the engine begins to operate (assuming that the initial starting temperature is approximately zero Fahrenheit), the thermostat will continue the opening movement of the choke valve, and when the exhaust pipe 44 has reached a temperature of approximately 150 degrees, the choke valve will be in full open position, or nearly so. After the full open position of the choke is reached, further movement thereof is prevented by stop means 99, as shown in broken lines in Figure 7, and further heating of the thermostat will cause compression of the spring 50. The strength of this spring is insufficient to cause permanent deformation of the thermostat at high temperatures.

In the second modification, as shown in Figure 7, the arm 47 is loose on the choke shaft and may rotate approximately 30 degrees clockwise relative to shaft 10 and arm 57 rigid therewith before the spring 50 is compressed. In this modification, sufficient movement of the piston 53 is permitted prior to the closing of the valve 63 to permit the suction to fully open the choke valve.

With the latter construction, closing movements of the choke valve will occur whenever the suction in the intake manifold is lowered, unless the temperature is so high that the lost motion between the arm 47 and the stop 58 has already been taken up. This is very desirable for acceleration when the temperature is comparatively low, and it will be noted that the partial closing of the choke valve in response to lowering of the depression in the discharge outlet of the carburetor is eliminated when the thermostat 43 is hot enough to move the arm 47 into contact with stop 58. For instance, if the operating temperature of the thermostat is 150 degrees with the choke valve fully open, the 30 degrees of closing movement would still be permitted when the suction drops. If the temperature rises another 25 or 30 degrees, the arm 47 will be given approximately 10 degrees of angular movement in a clockwise direction with reference to Figure 1. If the suction now falls, the choke valve can only have 20 degrees of closing movement before contact of the stop 58 with the arm 47, and if the temperature is still further raised by 40 or 50 degrees, the choke valve will not close at all when the suction drops. Inasmuch as the normal operating temperature of the thermostat is approximately 250 or 300 degrees, it will be seen that the choke valve will be kept in full open position for normal operation, but under low temperatures and before the engine is fully warmed up, there will be a slight closing movement of the choke valve to assist acceleration.

I claim:

1. In a carburetor for internal combustion engines, a downdraft air passage, a throttle valve at the lower end thereof, a choke valve at the upper end thereof, said choke valve comprising a suction operated portion and a solid portion, a shaft rigidly fixed to said solid portion, a piston connecting with said shaft, a cylinder for said piston, a connection for conveying suction to said cylinder from a point in said air passage below said throttle, and a heat responsive device constructed and arranged to act in opposition to the opening of the choke valve when the temperature is low.

2. In a carburetor, means forming a downdraft air passageway, a choke valve at the upper end of said passage, a throttle valve at the lower end of said passage, a pair of fuel nozzles discharging by suction into said air passageway, one of said nozzles discharging at a comparatively low level adjacent said throttle, and the other discharging at a comparatively high level between said throttle and said choke valve, a suction operated piston for operating said choke valve, spring means normally tending to hold said choke valve in closed position, whereby the suction in said carburetor will be simultaneously concentrated on both of said nozzles, a suction passage connected at a point below said throttle to convey suction to operate said piston, and a valve carried by said piston for controlling said suction passage.

3. In a carburetor, means forming an air passageway, a choke valve at the inlet end of said passage, a throttle valve at the outlet end of said passage, a pair of fuel nozzles discharging by suction into said air passageway, one of said nozzles discharging adjacent said throttle, and the other discharging between said throttle and said choke valve, a suction operated piston for operating said choke valve, heat responsive means yieldably tending to hold said choke valve in closed position when the temperature is low, whereby the suction in said carburetor will be simultaneously concentrated on both of said nozzles, a suction passage connected to a point below said throttle to convey suction to operate said piston, and a valve carried by said piston for controlling said suction passage.

4. In a plain tube carburetor, means forming a mixing conduit, means forming a venturi in said mixing conduit, a main fuel nozzle discharging into said venturi, a throttle controlling the discharge of mixture from said carburetor, a second fuel nozzle discharging into said mixing conduit adjacent said throttle valve, a choke valve for controlling the admission of air to said conduit, said choke valve including a part which is movable toward open position by direct action of suction, a suction operated piston connected to said choke in such a manner as to tend to open the choke upon increases of suction, and a thermostat connected to said choke.

5. In a carburetor, means forming a mixing conduit, a plurality of venturis in said mixing conduit, a main fuel nozzle discharging into one of said venturis, a throttle controlling the discharge of mixture from said carburetor, a second fuel nozzle discharging into said mixing conduit adjacent said throttle valve, a choke valve for controlling the admission of air to said conduit, said choke valve including a part which is movable toward open position by direct action of suction, a suction operated piston connected to said choke in such a manner as to tend to open said choke upon increases in suction, a thermostat connected to said choke, said thermostat being connected to said choke through a yieldable connection, whereby said thermostat may continue to move after any stoppage of the movement of said choke valve.

6. In a plain tube carburetor, means forming a mixing conduit, means forming a venturi in said mixing conduit, a main fuel nozzle discharging into said venturi, a throttle controlling the discharge of mixture from said carburetor, a second fuel nozzle discharging into said mixing conduit adjacent said throttle valve, a choke valve for controlling the admission of air to said conduit, said choke valve including a part which is movable toward open position by direct action of suction, a suction operated piston connected to said choke in such a manner as to tend to open said choke upon increases in suction, a thermostat connected to said choke, said thermostat being connected to said choke through a yieldable connection, whereby said thermostat may continue to move after any stoppage of the movement of said choke.

7. In a carburetor, means forming a mixing conduit, a choke valve controlling the admission of air to said mixing conduit, said choke valve having a part which is movable toward open position by direct action of suction, suction operated means for opening said choke valve a limited distance only, said suction operated means being constructed and arranged to permit a continuance of the opening of said choke valve after the cessation of movement of said suction operated means, and a heat responsive element connected to said choke valve to control the same in conjunction with said suction operated device.

8. In a carburetor, means forming a mixing conduit, a choke valve controlling the admission of air to said mixing conduit, suction operated means comprising a piston and cylinder for opening said choke valve for a limited degree only, said suction operated means being constructed and arranged to permit the continued opening movement of said choke to full open position, and means utilizing the direct action of suction for continuing the opening movement of said choke valve after said suction operated means has ceased operating.

9. In a carburetor, means forming a mixing conduit, a choke valve for controlling the admission of air to said conduit, said choke valve comprising a stem, a portion rigid with said stem, and a portion movable with respect to said rigid portion and adapted to be directly operated by suction, and additional means operated by the suction existing in the outlet end of the mixing conduit for controlling the rigid portion of said choke valve.

10. In a carburetor, means forming a mixing conduit, a choke valve for controlling the admission of air to said conduit, said choke valve comprising a stem, a portion rigid with said stem, and a portion movable with respect to said rigid portion and adapted to be directly operated by suction, additional means operated by the suction existing in the outlet end of the mixing conduit for controlling the rigid portion of said choke valve, and means including a heat responsive device for controlling the mixture delivered by said carburetor.

11. In a carburetor, means forming a mixing conduit, a choke valve for controlling the admission of air to said conduit, said choke valve comprising a stem, a portion rigid with said stem, and a portion movable with respect to said rigid portion and adapted to be directly operated by suction, additional suction operated means for controlling the rigid portion of said choke valve, and latch means controlled in accordance with the position of the solid portion of said choke valve for limiting the movements of that portion of the choke valve which is directly operated by suction.

12. In a carburetor, means forming a mixing conduit, a choke valve for controlling the admission of air to said conduit, said choke valve comprising a stem, a portion rigid with said stem, and a portion movable with respect to said rigid portion and adapted to be directly operated by suction, additional suction operated means for controlling the rigid portion of said choke valve, latch means controlled in accordance with the position of the solid portion of said choke valve for limiting the movements of that portion of the choke valve which is directly operated by suction, and means including a heat responsive device for controlling the mixture delivered by said carburetor.

13. In a carburetor, means forming a mixing conduit, a choke valve for controlling the admission of air to said conduit, said choke valve comprising a stem, a portion rigid with said stem, and a portion movable with respect to said rigid portion and adapted to be directly operated by suction, additional suction operated means for controlling the rigid portion of said choke valve, and a heat responsive element for operating said choke valve in conjunction with said suction operated means.

14. In a carburetor, means forming a mixing conduit, a choke valve for controlling the admission of air to said conduit, a plurality of interconnected nozzles discharging fuel into said conduit at spaced points, both posterior to said choke valve, a throttle valve controlling the discharge of mixture from said conduit, a heat responsive element for controlling the position of said choke valve, suction operated means carried by said choke valve for admitting air by suction when said choke valve is completely closed, and means in addition to said suction operated means for automatically opening said choke valve a predetermined degree whenever said engine is running under its own power.

15. In a plain tube carburetor, means forming a mixing conduit, a throttle at the outlet of said conduit, a choke valve for controlling the admission of air to said conduit, a heat responsive device connected to the operating shaft of said choke valve, a suction responsive device connected to the operating shaft of said choke valve and operated by the suction existing in the outlet of said mixing conduit, one of said devices being free to move in one direction only with respect to said shaft, and the other of said devices being rigidly connected to said shaft, said mixing conduit anterior to said throttle being open and of constant size regardless of suction when the normal operating temperature is maintained or exceeded.

16. In a device of the class described, a choke valve, a shaft for said choke valve, said choke valve comprising a portion solidly fixed to said shaft and a suction operated portion, means controlled by the position of said shaft for limiting the movement of said suction operated portion, means comprising a suction responsive element and a heat responsive element for controlling the position of said shaft, said suction responsive element being adapted to initiate an opening movement of said choke valve, and said heat responsive element being constructed and arranged to complete the opening movement of said choke valve.

17. In a carburetor for internal combustion engines, an air passage, a throttle valve and a choke valve in said passage, said choke valve comprising a plurality of portions, one of said portions being suction operated, a shaft rigidly fixed to another of said portions, a piston connected to said shaft, a cylinder for said piston communicating with said air passage posterior to said throttle, and a heat responsive device constructed and arranged to act in opposition to the opening of the choke valve when the temperature is low.

18. In a carburetor for internal combustion engines, an air passage, a throttle valve and a choke valve in said passage, said choke valve comprising a plurality of portions, one of said portions being suction operated, a shaft rigidly fixed to another of said portions, a piston connected to said shaft, a cylinder for said piston communicating with said air passage posterior to said throttle, and a heat responsive device constructed and arranged to act in opposition to the opening of the choke valve when the temperature is low, said mixing conduit anterior to said throttle being open and of constant size regardless of suction when the normal operating temperature is maintained or exceeded.

19. In combination with an internal combustion engine, a plain tube carburetor having a mixing conduit, a choke valve, and a throttle valve for said conduit, temperature responsive means yieldingly urging the choke valve toward closed position when the temperature is low, and suction operated means capable of moving the valve to at least a partially opened position against the force of the temperature responsive means, said mixing conduit between said choke and said throttle being open and of fixed size regardless of suction, said choke valve being moved to fully open position when the normal operating temperature is reached or exceeded and remaining in such fully open position as long as said normal operating temperature is maintained or exceeded regardless of suction.

20. In a carburetor for internal combustion engines, an air passage, a throttle valve adjacent the posterior end thereof, a choke valve adjacent the anterior end thereof, said choke valve comprising a suction operated portion and a solid portion, a shaft rigidly fixed to said solid portion, a piston connecting with said shaft, a cylinder for said piston, a connection for conveying suction to said cylinder from a point in said air passage posterior to said throttle, and a heat responsive device constructed and arranged to urge the choke valve toward fully open position when the temperature is high.

21. In a carburetor for internal combustion engines, an air passage, a throttle valve adjacent the posterior end thereof, a choke valve adjacent the anterior end thereof, said choke valve comprising a suction operated portion and a solid portion, a shaft rigidly fixed to said solid portion, a piston connecting with said shaft, a cylinder for said piston, a connection for conveying suction to said cylinder from a point in said air passage posterior to said throttle, and a heat responsive device constructed and arranged to urge the choke valve toward closed position when the temperature is low.

22. In a carburetor, an induction passage having an air inlet, a choke valve controlling the air inlet, a throttle controlling the induction passage, a bimetallic spring thermostat having a resilient connection with the choke valve and adapted to close the choke valve when cold and to completely open it when hot, a suction chamber connected to the induction passage posterior to the throttle and having a movable wall responsive to suction therein, yielding means urging said wall in a direction opposite to the force exerted on it by suction, and a one-way actuating connection between the wall and the choke valve.

23. In combination with an internal combustion engine, a plain tube carburetor having a choke valve, temperature responsive means yieldingly urging the choke valve toward closed position when the temperature is low, and suction operated means capable of moving the valve to a partially opened position against the force of the temperature responsive means, the admission of air to said carburetor being open and unrestricted except by said choke valve, said choke valve being moved to fully open position when the normal operating temperature is reached or exceeded and remaining in such fully open position as long as said normal operating temperature is maintained or exceeded, regardless of suction.

OTTO HENNING.